United States Patent

[11] 3,594,893

| [72] | Inventor | Hubert Kuypers<br>Bad Nenndorf, Germany |
|------|----------|-----------------------------------------|
| [21] | Appl. No. | 777,679 |
| [22] | Filed | Nov. 21, 1968 |
| [45] | Patented | July 27, 1971 |
| [73] | Assignee | Kabel-und Metallwerke, Gutehoffnung-shutte<br>Hannover, Germany |

[54] METHOD FOR JOINING CORRUGATED TUBES
10 Claims, 2 Drawing Figs.

[52] U.S. Cl. .................................................. 29/470.5,
29/482, 285/286, 285/368
[51] Int. Cl. ................................................ B23k 31/02
[50] Field of Search .......................................... 29/484,
470.5, 470.7, 482, 486; 285/286, Dig 11, 226, 368

[56] References Cited
UNITED STATES PATENTS
1,939,936 12/1933 Walker et al. ............... 285/286 X

| 2,232,656 | 2/1941 | Davis | 29/497 X |
|-----------|--------|-------|----------|
| 2,323,912 | 7/1943 | Johnson | 285/C |
| 2,479,104 | 8/1949 | Dreyer | 285/368 X |
| 2,485,370 | 10/1949 | Dreyer | 285/368 X |
| 3,023,496 | 3/1962 | Millar | 29/482 X |
| 3,264,732 | 8/1966 | Fannon Jr. | 29/497 X |

*Primary Examiner*—John F. Campbell
*Assistant Examiner*—Richard Bernard Lazarus
*Attorney*—Smyth, Roston & Pavitt ABSTRACT: A method for joining corrugated tubes is disclosed according to which an end portion of a tube to be joined is upset, using, for example, a flange ring and a tool plate and tightening them together temporarily to effect upsetting, and to produce a wide end ring at the tube. After removal of the tool plate, the flange ring on such a tube end is tightened to the flange ring on a similarly prepared tube end or otherwise, to effect broad, tight contact of the end ring with whatever surface is presented for the connection.

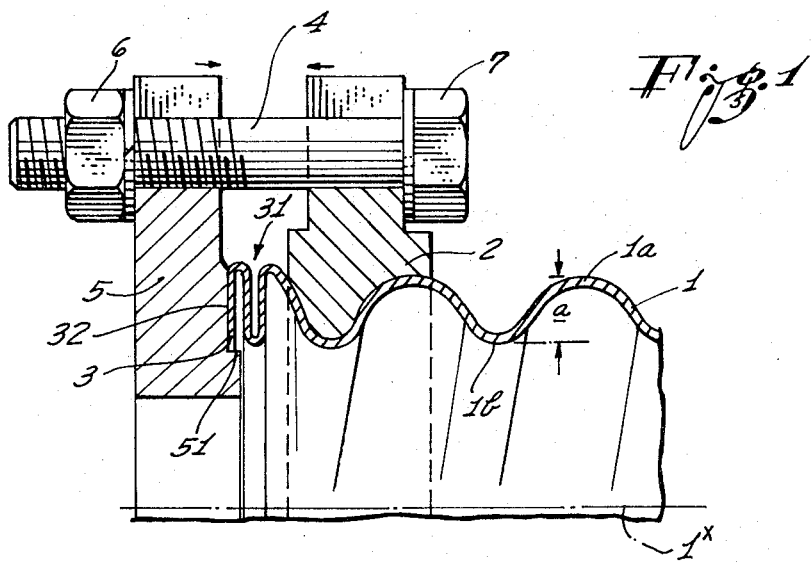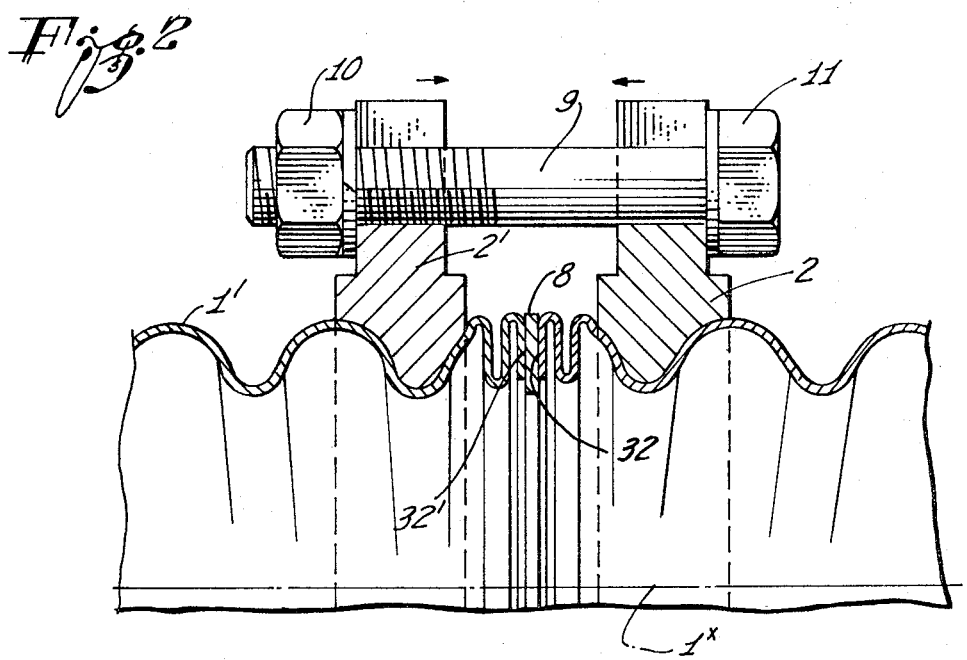
INVENTOR:
Hubert Kuypers
ATTORNEYS

METHOD FOR JOINING CORRUGATED TUBES

Bellowslike tubes having a corrugated wall with spirally or circularly extending grooves and ridges are well known in the art. The invention relates particularly to a method for releasably or unreleasably joining such a corrugated tube, either to another similar tube or to an inlet or outlet, etc. Such tubes are used particularly for providing tubes with flexibility to permit, for example, installation of curved pipe line or the like. Often such tubes are wound on drums to facilitate their transportation and they are cut into segments at the location of installation, where they have to be joined to equipment already installed, such as the end of a previously installed tube which was reeled from another drum or any other reason.

Inner and outer diameters of such a tube vary inherently as result of the corrugation and periodically in an axial direction over an "amplitude" range far exceeding the wall thickness of such a tube. "Corrugation amplitude" is intended to mean the radial height of a corrugation groove over a corrugation ridge, i.e., the difference between the tube radius toward a ridge and the tube radius toward a groove of the corrugation. It is thus inevitable that two tube portions which have been cut in radial planes at right angles to their respective axes, and in different portions of the corrugation pattern, have different end openings. If a tube has a circular groove-ridge pattern as corrugation, so that the tube resembles bellows, the end plane may run through a groove, through a ridge, or in between, so that the end face opening of the tube respectively is small, large, or in between. If the corrugation is formed of a spiral or helical groove-ridge pattern, an end opening is never circular but oblong. In general then, two such tube ends, when facing each other for being joined, must be expected to face each other with different end face diameters and contours.

It is, of course, presumed that the joining does not involve two tubes which previously formed a single tube and had been cut for any reason right where to be joined again. In this case, of course, matching end faces would face each other. Nevertheless, even here, tubes with helical corrugation may now have different angular position in relation to the tube axis so that their oblong ends are not in indexing position, and they may already have been installed to the extent that they cannot be rotated any more. Additionally, these tubes cannot be expected to be manufactured so accurately that each cross-sectional ring of a tube is always completely concentrical with the axis of the tube. Thus, even if one would cut tubes to form ends only in a particular manner, for example, only in planes traversing grooves, it cannot be expected that two such tube ends cut from different tube strings face each other with completely matching ends faces permitting, for example, welding of the respective two end faces to each other.

The best known method heretofore used for joining such corrugated tubes requires that flanges are respectively placed onto the two ends. The two ends are beaded outwardly and the two flanges are then tightened in a suitable manner. This method, however, has many disadvantages. If the tube has a helical corrugation, then, as already stated, the cross-sectional contour in any plane perpendicular to the axis, i.e., in any plane for cutting the tubing into segments of desired lengths, is inherently eccentric, and the beading results necessarily in an eccentrical flange.

Beading in the indentations or grooves, i.e., beading of those tube portions having an orientation towards the center of the tube, is exceedingly difficult and there is great danger that radial cracks are formed in the tube wall. Such a danger depends to a considerable extend upon the material used for the pipes, but it can be regarded generally as increasing with increasing thickness of the tube wall. Therefore, it is necessary in such cases to provide only rather small beading, so that the two end faces of the two tubes which are urged towards each other upon tightening the flange elements, will be comparatively small in relation to the diameter of the tube. This, in turn, results in a considerable reduction of the permissible operating pressure for such tube, as such a joining structure is the "weakest link in the chain," i.e., the weakest point in the entire pipe system. Another disadvantage is, of course, to be seen in that the environmental conditions under which such tubes and pipes are installed are often very inconvenient places to work in, so that the joining of the tubes is rather time consuming and cannot or will not be carried out with the required degree of care.

It is an object of the present invention to provide a method for joining such tubes, releasably or unreleasably, whereby at least one of the tubes is to be corrugated; the novel method obviates the disadvantages of the known methods of joining corrugated tubes while the resulting in additional advantages. It is another object of the present invention to provide a method for joining metallic, preferably copper, tubes or the like, at least one of which is corrugated.

The method, in accordance with the present invention, has as its main characterizing feature that the end of a corrugated tube is prepared by upsetting the end axially over a distance of at least one corrugation "wavelength," which is an axial distance from ridge-to-ridge or groove-to-groove, to provide a relatively wide end ring. Thus prepared tube is joined in a gastight manner to a similarly prepared tube or otherwise, using the end face of the newly formed end ring for engagement. The joining includes preferably employment of a flange ring placed on the tube prior to upsetting, and the upsetting step involves particularly the tube portion extending from the flange ring as suitably positioned, to the tube end proper. The flange ring is then tightened to a similar one on a similarly prepared tube end or otherwise.

While the specification concludes the claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 1 and 2 illustrate cross-sectional views through tube and equipment for joining two tube ends, they illustrate particularly completion of two sequential phases of the preferred way of practicing the method in accordance with the present invention.

In Fig. 1 there is illustrated a portion of corrugated tube 1 having a center axis $1^x$ and to be coaxially joined, for example, with another tube, such as tube 1' in Fig. 2. It is assumed that the corrugation is a helical one resembling, therefore, the threading of a bolt. Initially, tube 1 has configuration throughout its axial extension, as shown in the right-hand portion of Fig. 1, i.e., without the upset end portion 31 of the tube. The end face 3 of such a tube is established particularly by cutting a portion from a string of corrugated tubing and in a plane perpendicular to axis $1^x$. The regular corrugation waveform of the tube wall as it appears in any radially extending cross-sectional plane through the tube's axis, just ends at 3 whenever the transverse plane of cutting happens to cut through the corrugation; it can be at a ridge portion, at a groove portion, or in between. Moreover, if the corrugation results from a helical ridge-groove pattern, such a plane may cut through a groove in one portion of the tube and possibly through a ridge in the diametrically opposed portion of the tube, depending on the pitch of the corrugation helix and on the axial wavelength of the corrugation pattern.

A flange ring 2 is provided as an auxiliary element for providing the contemplated joint. Ring 2 has an inner cross section profile, radially and axially, to permit matching threading of ring 2 onto the helical corrugations of tube 1 in a manner resembling the threading of a nut onto a bolt. Flange ring 2 is thus screwed onto tube 1 until some of the tube projects on the other side, which, in the drawing of Fig. 1, is the left-hand side of the tube. The length of that protruding tube portion should at least equal one axial wavelength of the corrugation. As stated above, a wavelength is equal to an axial distance on the tube taken from ridge peak-to-ridge peak or from groove-to-groove.

Flange 2 has several bores, preferably symmetrically disposed around the periphery and extending in axial direction. A bolt 4 is shown in Fig. 1 in one of these bores. As a next step for making the desired joint, a tool in form of a ring plate 5 is placed in a particular position. Ring plate 5 has likewise a plurality of axially oriented bores, and plate 5 is positioned so that its bores respectively index and align with the bores of flange ring 2. Bolts such as 4 are placed respectively into pairs of aligned ring plate-flange ring bores.

The bolts such as 4 are threaded but the bores in elements 2 and 5 receive the bolts slidingly. However, nuts 6 and 7 are shown in Fig. 1 as having been threaded onto opposite ends of bolt 4. The plate 5 has a front face facing the tube end. Upon tightening nuts, such as 6 and 7, and others, flange 2 and plate 5 are urged toward each other, as shown by the two arrows in Fig 1, thereby upsetting and squeezing the tube end. The tube end particularly illustrated at 32 in Fig. 1 is thereby bent down as the original cut through the undeformed tube (at 3) happens to run through a groove at that point. The corrugation as between flange ring 2 and tube end 2 is thus deformed, squeezed and flattened by the upsetting operation. Subsequently, tool 5 and bolts 4 are removed.

The upset portion of the tube as it projected from ring 2 to the left thereof, forms an end ring 31. In particular, the completed end ring 31 has been produced by upsetting the tube and over a distance more than one "wavelength" of the corrugations of tube 1 taken in axial direction. As a consequence, a broad axial flange or end ring 31 is produced, extending concentrical around axis 1' of tube 1 and having a ring width about equal to the difference $a$ between inner radius of a groove and the outer radius of a ridge of the corrugation.

It follows from the foregoing that a wide concentric end ring 31, with a face 32, facing axially in outward direction, has been provided by the upsetting operation. Most significantly, that ring width $a$ is considerably larger than the thickness of the tube's wall, i.e., than the width of the untreated end face 3 of the tube. Actually the resulting ring face 32 has a ring width which can be expected to be somewhat in excess of that dimension $a$. This end ring 31 or ring-shaped flange is strictly concentrical to axis 1' and has dimensions, particularly in radial direction, which will be the same for any such tube if treated in that manner, regardless of where the initial tube end was cut with reference to the corrugation pattern thereof. In FIG. 1 the initial tube end 3 appears bent down. As a helical corrugation pattern is shown, the tube end may be bent up in the diametrically opposed area of end ring 31.

The operation, as explained above, is repeated with a second tube such as 1' in Fig. 2, possibly using the same tool plate 5, and the same bolts such as 4. Each of the tube ends thus has obtained a broad upset ring and next to it is positioned a flange ring such as 2 and 2', which remain in position.

Fig. 2 illustrates how the two thus treated tube ends are joined axially end-to-end. In particular, the two flange rings 2 and 2' are positioned in mutually axial alignments to their bores, and in this indexing position of pairs of bores, bolts such as 9 are inserted in the respectively aligned bore pairs. By means of nuts such as 10 and 11 flange rings 2 and 2' are now bolted together, whereby the upset ring ends of the two tubes are urged toward each other in face-to-face engagement, directly or indirectly, of the ring surfaces 32 and 32'. The faces 32 and 32' may engage directly, but in the particular configuration illustrated, sealing ring 8 is interposed between them to ensure gastight sealing.

The ring surfaces 32 and 32' have similar radial dimensions, and they are concentrical, as the axial alignment of respective pairs of bores in flange rings 2 and 2' forces tubes 1 and 1' into coaxial position. Therefore, there is full face-to-face contact without exception, as between the two end rings formed previously by upsetting. The nuts such as 10 and 11 on bolt 9 are now tightened to urge the two flange rings 2 and 2' toward each other so as to provide gastight joint.

The method can be practiced in a very fast and simple manner, whereby actually the squeezed and upset pipe ends reinforce the joining area; the relatively large joining structure resulting from upset and squeeze, together with the inclusion of a sealing ring provides a joining structure which by no means is the weakest link in an installed line of tubing.

It is obvious that the practicing of the method is facilitated in those cases in which the tubes have helical corrugations, thereby resembling the thread of a bolt, as such tube configuration facilities the placement of the required flange rings. If grooves and ridges are circular parallel so that the tube resembles bellows, then the flange ring has to be divided and the two portions are placed in position separately. The two portions are then bolted together to form the completely flange ring. This bolting operation precedes the bolting operation explained above with reference to Fig. 1.

The tightening of the two flange rings on the respective tube ends (final step in Fig. 2) will cause a plastic deformation of the contact areas of the end ring 31 of the tube. Upon heat treating, e.g., by annealing such deformed region, the deformation can actually be increased and some plastic deformation can be obtained, so that a completely gastight seal can be produced, even without a seal ring, such as 8. Nevertheless, the employment of a seal ring is advisable, particularly in case high pressure is expected to occur in the tube, because the front faces 32, 32' are not completely planar. The previous front end such as 3 of tube 1 is now bent down and extends as an unevenness on the ring face 32. A sealing ring 8 will cover these unevennesses to eliminate any leakage by snugly covering each of the ring faces 32, 32' and tightly engaging those ring faces particularly along the perimeter thereof.

The squeezing step described above, with reference to Fig. 1, has been described in relation to utilization of a particular tool which includes the employment of aligning bolts such as 4 and of a tool plate 5, for upsetting the end portion of the tube as it projects from flange ring 2. This was found to be the most practical way of obtaining the end ring 31, but other tools and other mechanical or hydraulic devices can be used to upset the tube end.

One can see from the foregoing that due to the individual preparation of each tube end, the joining method is not limited to joining two tubes. A tube prepared, as was described with reference to Fig. 1, receives a flange ring 2 and is deformed to obtain a broad end ring 31 with a broad ring face 32. Flange ring and end ring are concentric to each other and to the tube axis. Particularly, the bores in ring 2 obtain a particular radial distance from the tube axis. This joining structure can be secured to any other device permitting broad contact with that newly formed front face 32 of the tube, particularly as long as that device has a corresponding set of bores defining a particular axial position for the tube to be connected thereto. In general, this will be a coaxial position to an opening to be aligned for fluid conduct with the tube. This includes joining of the tube to solid, i.e., uncorrugated tubes, to cross links or T-shaped connecting elements, etc.

Another point is that the ultimate joining of the two tubes, as was described with reference to Fig. 2, has been described in a manner which establishes a releasable joint, i.e., the tubes are bolted together in a relesasable manner. Of course, the newly formed broad end ring of a tube could be unreleasably joined, for example, to another tube or to any other structure, for example, by welding. The upset corrugations defining the end ring will operate here for compensating deformations resulting from such heat treatment still alternatively, instead of using bolts such as 9 one could use rivets, e.g., to rivet the flange rings to each other.

It can be seen that, broadly speaking, the tube is prepared for joining in a manner establishing an end ring which is to a considerable extent independent from the corrugation, except that the radial width of the end ring reflects the height of a ridge over a groove of the corrugation. Nevertheless, a tube end prepared in this manner can be joined to a tube with different type corrugation. For example, one tube can have helical and the other one bellowslike corrugation. The "-wavelengths" of the corrugations as defined may differ. The wall thickness of the tubes may differ. Even the overall diameter of the tubes may differ, as long as the end rings formed have sufficiently wide, common, concentric surface area of contact.

The invention is not limited to the embodiments described above, but all changes and modifications thereof not constituting departures from the spirit and scope of the invention are intended to be covered by the following claims.

I claim:

1. A method for joining a tube to a surface having an opening, the tube having corrugated walls with corrugation grooves and ridges extending helically or circularly around the tube axis, comprising the steps of:
   placing a flange ring onto the tube so that an end portion of the tube projects from the flange ring for an axial distance at least equal to an axial groove-to-groove distance of the corrugation;
   placing a plate in abutting relationship to the yet unsqueezed tube end as projecting from the flange ring and in parallel relation thereto;
   bolting the plate to the flange ring;
   axially tightening the bolts, to obtain axial upsetting of said projecting to be portion, to form a broad front end ring having an axially facing ring-shaped front face, the radial ring width being comparable with the height of a ridge above a groove of the corrugated tube and extending substantially concentrical to the axis of the tube;
   removing the bolts and plate; and
   gastightly joining the front end ring of the tube thus formed to the surface having the opening.

2. A method for joining a tube to a surface having an opening, the tube having corrugated walls with corrugation grooves and ridges extending helically around the tube axis resembling threading of a bolt, comprising the steps of:
   placing a flange ring onto the tube so that an end portion of the tube projects from the flange ring for an axial distance at least equal to an axial groove-to-groove distance of the corrugation,
   the flange ring having a configuration resembling threading of a matching nut, the ring being placed on the tube by threading the ring onto the tube;
   upsetting the projecting end portion of the tube in axial direction, to form a broad front end ring having an axially facing ring-shaped front face, the radial ring width being comparable with the height of a ridge above a groove of the corrugated tube and extending substantially concentrical to the axis of the tube; and
   gastightly joining the front end ring of the tube thus formed to the surface having the opening.

3. The method as set forth in claim 1, the joining step including tightening of the flange ring to the object having said surface having said opening.

4. The method as set forth in claim 3, and including additionally, duplicating the upsetting step and the additional step with a second corrugated tube under inclusion of a second flange ring, the joining step including placing the resulting two ring faces of the two tubes in coaxial relation and tightening the two rings flanges together.

5. The method as set forth in claim 1, the ring-shaped front face being gastightly joined to the surface.

6. The method as set forth in claim 5, and including placement of a sealing element between the surface and the front face so that the joining step includes the inclusion of a sealing element in the joint.

7. The method as set forth in claim 5, the front face being subjected to annealing.

8. The method as set forth in claim 1, the ring-shaped front face being joined to the surface by welding.

9. The method as set forth in claim 1, including upsetting the end of a second, similar tube in an upsetting step similar to the one to which the first tube is subjected, the joining step including joining the two tubes by forcing the two end rings toward each other.

10. The method as set forth in claim 1, the joining step including urging the end ring toward the surface and tightening the end ring to the surface.